US011550998B2

(12) United States Patent
Cui et al.

(10) Patent No.: US 11,550,998 B2
(45) Date of Patent: Jan. 10, 2023

(54) METHOD AND APPARATUS FOR GENERATING A COMPETITION COMMENTARY BASED ON ARTIFICIAL INTELLIGENCE, AND STORAGE MEDIUM

(71) Applicant: BEIJING BAIDU NETCOM SCIENCE AND TECHNOLOGY CO., LTD., Beijing (CN)

(72) Inventors: Jianqing Cui, Beijing (CN); Yingchao Shi, Beijing (CN); Hao Tian, Beijing (CN); Shiqi Zhao, Beijing (CN); Qiaoqiao She, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1254 days.

(21) Appl. No.: 16/001,119

(22) Filed: Jun. 6, 2018

(65) Prior Publication Data

US 2018/0357508 A1 Dec. 13, 2018

(30) Foreign Application Priority Data

Jun. 7, 2017 (CN) .......................... 201710423242.5

(51) Int. Cl.
*G06F 40/00* (2020.01)
*G06F 40/216* (2020.01)
(Continued)

(52) U.S. Cl.
CPC ........ *G06F 40/216* (2020.01); *G06F 16/2477* (2019.01); *G06F 16/3347* (2019.01);
(Continued)

(58) Field of Classification Search
CPC ............... G06F 40/216; G06F 16/2477; G06F 16/3347; G06F 40/186; G06F 40/279;
(Continued)

(56) References Cited

U.S. PATENT DOCUMENTS

2006/0178868 A1* 8/2006 Billerey-Mosier ..... G06F 40/56
704/9

FOREIGN PATENT DOCUMENTS

| CN | 102427507 A | 4/2012 | |
| CN | 106776523 A | 5/2017 | |
| CN | 106776523 A * | 5/2017 | ........... G06F 16/219 |

OTHER PUBLICATIONS

Zheng et al, Automated event recognition for football commentary generation, International Journal of Gaming and Computer-Mediated Simulations (IJGCMS), Oct. 2010.*

(Continued)

*Primary Examiner* — Nancy Bitar
*Assistant Examiner* — Xiao Liu
(74) *Attorney, Agent, or Firm* — Brooks Kushman P.C.

(57) ABSTRACT

There is provided a method and apparatus for generating a competition commentary based on artificial intelligence, and a storage medium. The method comprises: obtaining commentator's words commentaries and structured data of historical competitions; generating a commentating model according to obtained information; during live broadcast of a competition, determining a corresponding words commentary according to the commentating model with respect to the structured data obtained each time.

15 Claims, 7 Drawing Sheets

(51) Int. Cl.
| | |
|---|---|
| *G06K 9/62* | (2022.01) |
| *G06F 16/2458* | (2019.01) |
| *G06F 16/33* | (2019.01) |
| *G06N 3/04* | (2006.01) |
| *G06N 3/08* | (2006.01) |
| *G06N 5/02* | (2006.01) |
| *G06F 40/56* | (2020.01) |
| *G06F 40/186* | (2020.01) |
| *G06F 40/279* | (2020.01) |
| *G06N 5/04* | (2006.01) |

(52) U.S. Cl.
CPC ......... *G06F 40/186* (2020.01); *G06F 40/279* (2020.01); *G06F 40/56* (2020.01); *G06K 9/6232* (2013.01); *G06K 9/6274* (2013.01); *G06N 3/0445* (2013.01); *G06N 3/08* (2013.01); *G06N 5/022* (2013.01); *G06K 9/629* (2013.01); *G06N 5/04* (2013.01)

(58) Field of Classification Search
CPC .......... G06F 40/56; G06F 16/21; G06F 16/30; G06F 40/166; G06K 9/6232; G06K 9/6274; G06K 9/629; G06N 3/0445; G06N 3/08; G06N 5/022; G06N 5/04; G06V 10/82
See application file for complete search history.

(56) References Cited

OTHER PUBLICATIONS

Zhang et al, Towards constructing sports news from live text commentary, Proceedings of the 54th Annual Meeting of the Association for Computational Linguistics (AMACL), pp. 1361-1371, Berlin, Germany, Aug. 7-12, 2016.*
Chinese Office Action dated Mar. 20, 2020, for related Chinese Appln. No. 201710423242.5; 4 Pages.
Chinese Search Report dated Mar. 12, 2020 for related Chinese Appln. No. 2017104232425; 2 Pages.

* cited by examiner

METHOD AND APPARATUS FOR GENERATING A COMPETITION COMMENTARY BASED ON ARTIFICIAL INTELLIGENCE, AND STORAGE MEDIUM

The present application claims the priority of Chinese Patent Application No. 2017104232425, filed on Jun. 7, 2017, with the title of "Method and apparatus for generating a competition commentary based on artificial intelligence, and storage medium". The disclosure of the above applications is incorporated herein by reference in its entirety.

FIELD OF THE DISCLOSURE

The present disclosure relates to the Internet technologies, and particularly to a method and apparatus for generating a competition commentary based on artificial intelligence, and a storage medium.

BACKGROUND OF THE DISCLOSURE

Artificial intelligence AI is a new technical science for researching and developing theories, methods, technologies and application systems for simulating, extending and expanding human intelligence. Artificial intelligence is a branch of computer sciences and attempts to learn about the essence of intelligence, and produces a new intelligent machine capable of responding in a manner similar to human intelligence. The studies in the field comprise robots, language recognition, image recognition, natural language processing, expert systems and the like.

In live broadcasting of a sports event, providing a commentary on the sports event may help spectators to better learn about sports event. At present, the commentary on the sports event is usually provided by a commentator in a words form or speech form.

The commentator's words commentary means that the commentator obtains information from multiple parties, sorts information and provides real-time words commentary.

For example, it is possible for a commentator to provide real-time words commentary according to real-time progress of an NBA match, and thereby provide live broadcasting of the match in a words manner.

However, the above manner has certain problems in practical application. For example, the commentator needs to spend a certain period of time in sorting information upon providing the words commentary, so the live broadcast will be delayed to different degrees. In addition, errors probably occur, for example, errors might occur in terms of data accuracy, typing and so on, thereby reducing the accuracy of the commentary.

SUMMARY OF THE DISCLOSURE

In view of the above, the present disclosure provides a method and apparatus for generating a competition commentary based on artificial intelligence, and a storage medium, which can reduce time delay and improve the accuracy of the commentaries.

Specific technical solutions are as follows:

A method of generating a competition commentary based on artificial intelligence, comprising:

obtaining commentator's words commentaries and structured data of historical competitions;

generating a commentating model according to obtained information;

during live broadcast of a competition, determining a corresponding words commentary according to the commentating model with respect to the structured data obtained each time.

According to a preferred embodiment of the present disclosure, the generating a commentating model according to obtained information comprises:

aligning commentator's words commentaries with structured data to obtain a series of first data pairs formed by the commentator's words commentaries and corresponding structured data;

generating the commentating model according to the first data pairs.

According to a preferred embodiment of the present disclosure, the commentating model comprises: a first commentating model and a second commentating model;

the determining a corresponding words commentary according to the commentating model with respect to the structured data obtained each time comprises:

with respect to the structured data obtained each time, determining a first words commentary according to the first commentating model, and determining a second words commentary according to the second commentating model;

selecting a better one from the first words commentary and second words commentary as a final words commentary.

According to a preferred embodiment of the present disclosure, the first commentating model is a commentating mode model, and the generating the commentating mode model according to the first data pairs comprises:

performing the following processing with respect to each of the first data pairs:

performing slot extraction and generalization for commentator's words commentary in the first data pair according to a pre-built field knowledge base, removing redundant modifying components from a generalization result, and generating a commentating template;

with respect to the first data pair, performing reasoning and feature extraction with reference to the field knowledge base, and generating a feature vector according to the extracted features, each feature corresponding to one dimension in the feature vector;

building a correspondence relationship between the feature vector and the commentating template to obtain a second data pair;

regarding the obtained second data pairs as the commentating mode model.

According to a preferred embodiment of the present disclosure, the extracted features comprise three classes: current event features, contextual features and dynamic features.

According to a preferred embodiment of the present disclosure, the step of, with respect to the structured data obtained each time, determining a first words commentary according to the first commentating model comprises:

generating a feature vector corresponding to the obtained structured data;

searching for the commentating mode model according to the feature vector to obtain a matched commentating template, and selecting an optimal commentating template to generate the first words commentary.

According to a preferred embodiment of the present disclosure, the second commentating template is a sequence generating template, and generating the sequence generating model according to the first data pairs comprises: performing the following processing with respect to each of the first data pairs:

with respect to the first data pair, performing reasoning and feature extraction with reference to the pre-built field knowledge base, and generating a feature vector according to the extracted features, each feature corresponding to one dimension in the feature vector;

generating a sequence text corresponding to the feature vector;

building a correspondence relationship between the sequence text and the commentator's words commentary in the first data pair, to obtain a third data pair;

regarding the sequence text as input, regarding the commentator's words commentary as output, and training according to the third data pairs to obtain the sequence generating model.

According to a preferred embodiment of the present disclosure, the generating a sequence text corresponding to the feature vector comprises:

performing literal translation for each dimension in the feature vector in respect of a feature name and a feature value;

joining literal translation results of features of dimensions in a predetermined order to obtain the sequence text.

According to a preferred embodiment of the present disclosure, the step of, with respect to the structured data obtained each time, determining a second words commentary according to the second commentating model comprises:

generating a feature vector corresponding to the obtained structured data;

generating a sequence text corresponding to the feature vector;

inputting the sequence text in the sequence generating model, and obtaining the second words commentary output by the sequence generating model.

An apparatus of generating a competition commentary based on artificial intelligence, comprising: a pre-processing unit and a commentating unit;

the pre-processing unit is configured to obtain commentator's words commentaries and structured data of historical competitions, and generate a commentating model according to obtained information;

the commentating unit is configured to, during live broadcast of a competition, determine a corresponding words commentary according to the commentating model with respect to the structured data obtained each time.

According to a preferred embodiment of the present disclosure, the pre-processing unit comprises: an obtaining sub-unit and a training sub-unit; the obtaining sub-unit is configured to obtain commentator's words commentaries and structured data of historical competitions;

the training sub-unit is configured to align commentator's words commentaries with structured data to obtain a series of first data pairs formed by the commentator's words commentaries and corresponding structured data, and generate the commentating model according to the first data pairs.

According to a preferred embodiment of the present disclosure, the commentating model comprises: a first commentating model and a second commentating model;

with respect to the structured data obtained each time, the commentating unit determines a first words commentary according to the first commentating model, determines a second words commentary according to the second commentating model, and then select a better one from the first words commentary and second words commentary as a final words commentary.

According to a preferred embodiment of the present disclosure, the first commentating model is a commentating mode model, and the training sub-unit performs the following processing with respect to each of the first data pairs:

perform slot extraction and generalization for commentator's words commentary in the first data pair according to a pre-built field knowledge base, remove redundant modifying components from a generalization result, and generate a commentating template;

with respect to the first data pair, perform reasoning and feature extraction with reference to the field knowledge base, and generate a feature vector according to the extracted features, each feature corresponding to one dimension in the feature vector;

build a correspondence relationship between the feature vector and the commentating template to obtain a second data pair;

regard the obtained second data pairs as the commentating mode model.

According to a preferred embodiment of the present disclosure, the extracted features comprise three classes: current event features, contextual features and dynamic features.

According to a preferred embodiment of the present disclosure, the commentating unit generates a feature vector corresponding to the obtained structured data, search for the commentating mode model according to the feature vector to obtain a matched commentating template, select an optimal commentating template to generate the first words commentary.

According to a preferred embodiment of the present disclosure, the second commentating template is a sequence generating template, and the training sub-unit performs the following processing with respect to each of the first data pairs:

with respect to the first data pair, perform reasoning and feature extraction with reference to the pre-built field knowledge base, and generate a feature vector according to the extracted features, each feature corresponding to one dimension in the feature vector;

generate a sequence text corresponding to the feature vector;

build a correspondence relationship between the sequence text and the commentator's words commentary in the first data pair, to obtain a third data pair;

regard the sequence text as input, regard the commentator's words commentary as output, and train according to the third data pairs to obtain the sequence generating model.

According to a preferred embodiment of the present disclosure, the training sub-unit performs literal translation for each dimension in the feature vector in respect of a feature name and a feature value, and joins literal translation results of features of dimensions in a predetermined order to obtain the sequence text.

According to a preferred embodiment of the present disclosure, the commentating unit generates a feature vector corresponding to the obtained structured data, generates a sequence text corresponding to the feature vector, inputs the sequence text in the sequence generating model, and obtain the second words commentary output by the sequence generating model.

A computer device, comprising a memory, a processor and a computer program which is stored on the memory and runs on the processor, the processor, upon executing the program, implementing the above-mentioned method.

A computer-readable storage medium on which a computer program is stored, the program, when executed by the processor, implementing the aforesaid method.

As can be seen from the above introduction, the solution of the present disclosure may be employed to generate the commentating model according to commentator's words commentaries and structured data of historical competitions so that subsequently during live broadcast of the competition, a corresponding words commentary is automatically generated according to the commentating model with respect to the structured data obtained each time. Furthermore, so long as the structure data is obtained, the words commentary may be generated almost without delay, thereby reducing time delay as compared with the prior art. Furthermore, automatic generation of the words commentary can avoid the errors stated in the prior art and thereby improve the accuracy of the commentary. In addition, automatic commentation may be performed many times so long as the commentating model is built one time, without professional commentators and with very low costs of implementation. Furthermore, the solution of the present disclosure is applicable for all competitions that generate structured data, and exhibits wide applicability.

DETAILED DESCRIPTION OF PREFERRED EMBODIMENTS

At present, sound informatization is implemented in almost all sports events. During the sports events, real-time event data will be generated, and these data are usually structured data stored in a database. Currently, these data are generally used for technical statistics of the event. In the solution of the present disclosure, it is feasible to, based on these data, generate real-time words commentary and implement automation of commentation.

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
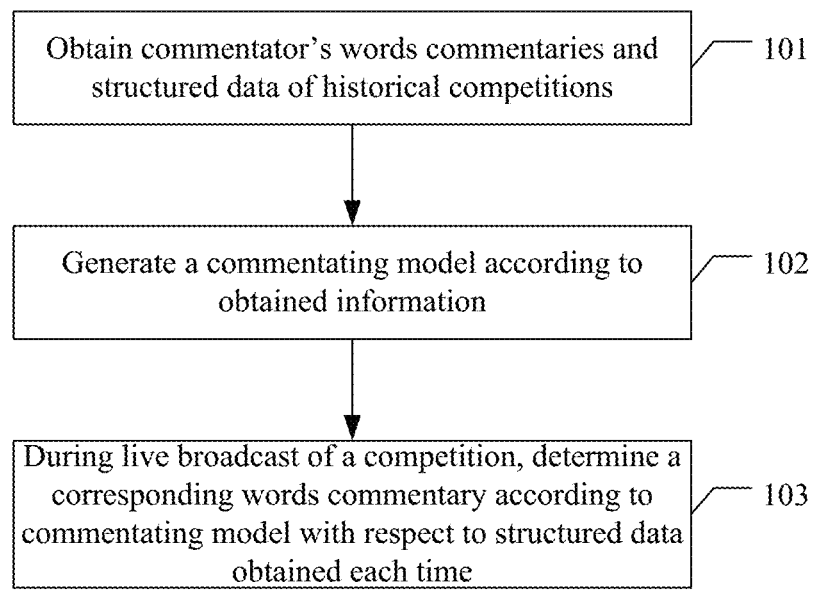
FIG. 1 is a flow chart of an embodiment of a method of generating a competition commentary according to the present disclosure.

FIG. 1 is a flow chart of an embodiment of a method of generating a competition commentary according to the present disclosure. As shown in FIG. 1, the embodiment comprises the following specific implementation mode.

In 101 are obtained commentator's words commentaries and structured data of historical competitions;

In 102, a commentating model is generated according to obtained information; In 103, during live broadcast of a competition, a corresponding words commentary is determined according to the commentating model with respect to the structured data obtained each time.

It can be seen that the above embodiment mainly comprises two processes, namely, an offline training process and an online real-time commentating process, which will be respectively described below in detail.

1) Offline Training Process

As stated above, in a competition, real-time competition data will be generated and these data are usually structured data stored in a database.

A piece of structured data may correspond to one or more events, preferably one event.

In the competition, a series of acts associated with one or more items of data may be called an event, for example, a two-point shot is an event.

Training data may be obtained first to obtain the commentating model.

Specifically, it is feasible to obtain commentator's words commentaries and structured data of a plurality of historical competitions. Take commentation of NBA as an example. It is feasible to obtain commentator's words commentaries and structured data of a plurality of historical NBA matches, for example, obtain commentator's running words commentaries and structured data of the first match of NBA finals in 2016.

In addition, it is feasible to pre-build a field knowledge base, namely, build an entity attribute knowledge base based on the competition type. Take commentation of NBA as an example. It is necessary to build a field knowledge base formed by players, teams, basketball technical terms.

It is feasible to, with respect to the obtained commentator's words commentaries and structured data of historical competitions, align commentator's words commentaries with structured data according to field values in the structured data and field values extracted from the commentator's words commentaries, thereby obtaining a series of first data pairs formed by the commentator's words commentaries and corresponding structured data.

Before aligning the commentator's words commentaries with the structured data, it is further feasible to perform data filtration, for example, remove data irrelevant to the commentation from the commentator's words commentaries, including comments, extended reports, message insertion and the like.

In addition, there might further involve the issue of alignment of a plurality of events. For example, when a plurality of events are included in one commentator's words commentary, alignment of the plurality of events needs to be performed. The difficulty in aligning the plurality of events lies in judgment of the boundaries of events. The boundaries have two cases: boundary are obvious, and boundaries intersect and overlap. Regarding the case that the boundaries intersect and overlap, it is possible to perform segmentation for the event based on the structured data in a complementing manner.

Take an example:

Lowry comes with the ball and gives it to DeRozan, makes a jump shot at a medium range, and throws it in;

Aligning event 1 (assist): Lowry comes with the ball and gives it to DeRozan;

Aligning event 2 (two-point shot): 【DeRozan】 makes a jump shot at a medium range, and throws it in;

wherein 【DeRozan】 is a result of complementation.

After the first data pairs are obtained, the commentating model may be generated based on the first data pairs. Specifically, there might be included two commentating models, namely, a first commentating model and a second commentating model.

The first commentating model may be a commentating mode model, and the second commentating model may be a sequence generating model. How to obtain the two models will be respectively described below in detail.

Figure 2:
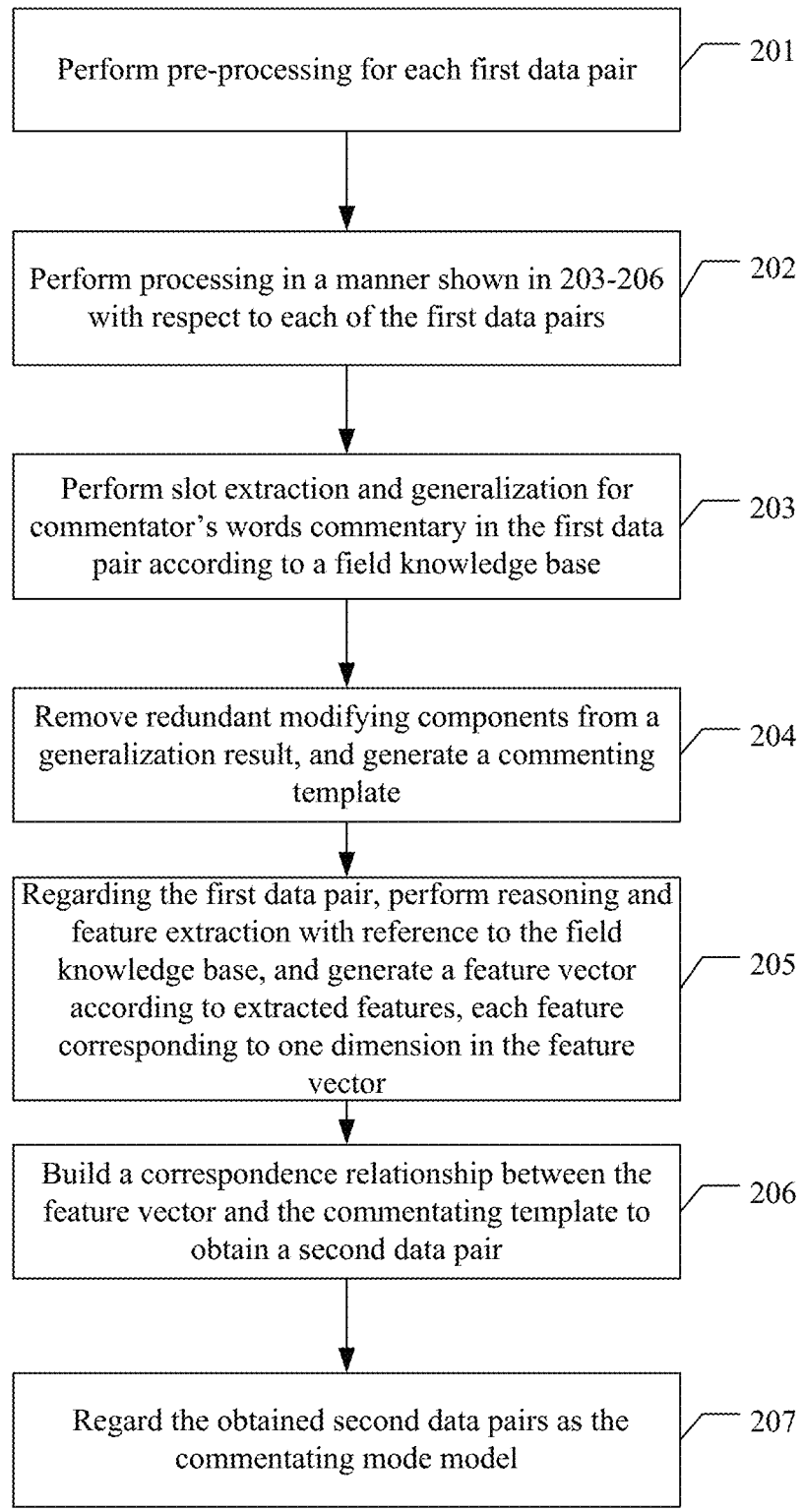
FIG. 2 is a flow chart of an embodiment of a method of obtaining a commentating mode model according to the present disclosure.

FIG. 2 is a flow chart of an embodiment of a method of obtaining a commentating mode model according to the present disclosure. As shown in FIG. 2, the embodiment comprises the following specific embodiment.

In 201, pre-processing is performed for the first data pairs.

Data cleaning may be performed for the first data pairs, for example to remove messy code, redundant punctuation marks, emoji and so on from the data.

In 202, processing is performed in a manner shown in 203-206 with respect to each of the first data pairs.

In 203, slot extraction and generalization is performed for commentator's words commentary in the first data pair according to a field knowledge base.

For example, it is feasible to regard players, teams and the like included in the field knowledge base as slot values, perform slot extraction, and generalize corresponding slots, e.g., generalize a slot corresponding to the slot value "Curry" as a "player".

204 relates to removing redundant modifying components from a generalization result, and generating a commenting template.

Regarding the generalization result, it is feasible to extract a trunk of the sentence, remove redundant modifying components and thereby generate a commentating template.

205 relates to, regarding the first data pair, performing reasoning and feature extraction with reference to the field knowledge base, and generating a feature vector according to the extracted features, each feature corresponding to one dimension in the feature vector.

The reasoning may include contextual reasoning and attribute reasoning. Through reasoning, expansion of information may be implemented, and information content be enriched.

Preferably, the extracted features may be classified into three classes: current event features, contextual features and dynamic features.

Take commentation of NBA as an example. The various features may respectively include:

The current event features may include: Match features: quarter number, the remainder of the quarter, a home team's score, a visiting team's score and the like;

Event features: three-point shot, two-point shot, assist, penalty free throw, rebound, steal and so on;

Result features: succeed, fail;

Event attribute features: penalty free throw (the total number of free throws, and the free throw serial number), rebound (offensive rebound and defensive rebound) and so on;

The contextual features may include:

context of the continuous same event, context of state transformation, context of the same event, context of the same event of the same team, context of the same event of the same player, context of the match event;

For example, if the current event is that Warriors player Thompson performs the second penalty free throw of two penalty free throws, and he makes the shot but fails the first free throw, it is concluded that the contextual feature is two free throws to make one;

Again for example, if the current event is that Warriors player Curry makes a three-point successful shot, and he previously made three-point shot twice wherein one is hit and one is missed, it can be concluded that the contextual feature is: make three-point shot three times, and hit two shots;

Dynamic features may include:

the umber of a player's continuous three-point shots, the number of a team's continuous three-point shots, the number of a player's continuous goals, the number of a team's continuous goals, the number of a team's continuous unsuccessful throws, and so on.

It needs to be appreciated that the above features are only for exemplary illustration purpose and not intended to limit the technical solution of the present disclosure. Upon specific implementation, specific features to be extracted may depend on actual needs and are not limited to what are shown above.

Which features are extracted may be prescribed in advance. When extraction is performed each time, regarding a certain feature, it is possible that the feature can be extracted out or cannot be extracted out. In the latter case, the extracted content may be set as void (0).

Each feature corresponds to one dimension in the feature vector, and the number of features is dimensions of the feature vector. First, the feature vector is first initialized as 0, then the feature vector may be updated according to discretization results of features, and thereby a desired feature vector is obtained. 206 relates to building a correspondence relationship between the feature vector and the commentating template to obtain a second data pair.

After processing is performed in the above manner, a second data pair may be obtained with respect to each first data pair.

In 207, the obtained second data pairs are regarded as the commentating mode model.

The obtained second data pairs are the desired commentating mode model.

The above describes how to obtain the commentating mode model. How to obtain the sequence generating model will be described hereunder.

Figure 3:
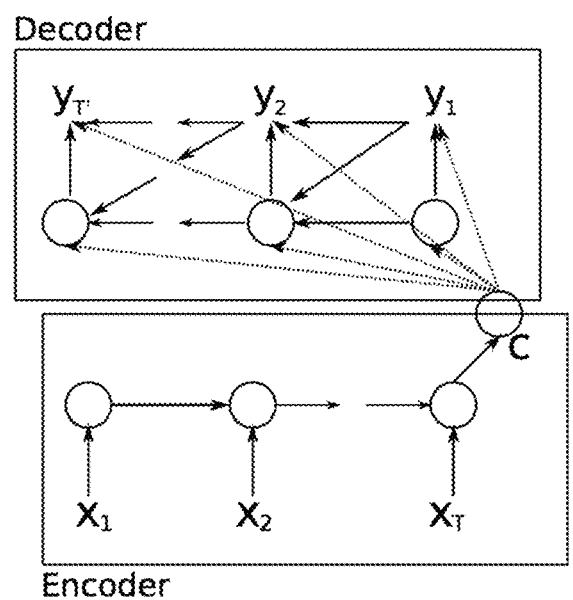
FIG. 3 is a schematic diagram of an encoder-decoder framework according to the present disclosure.

The sequence generating model employs an encoder-decoder framework. FIG. 3 is a schematic diagram of an encoder-decoder framework according to the present disclosure. As shown in FIG. 3, it is feasible to first perform encoding for an input sequence $X_1 X_2 \ldots X_T$, and then perform decoding based on an encoding result to generate an output sequence $Y_1 Y_2 \ldots Y_T$.

As far as the present disclosure is concerned, what is input is structured data, and what is output is a text sequence. Hence, it is necessary to construct the structured data into a serialized input. Preferably, the serialized input may be obtained by literally translating the structured data.

Figure 4:
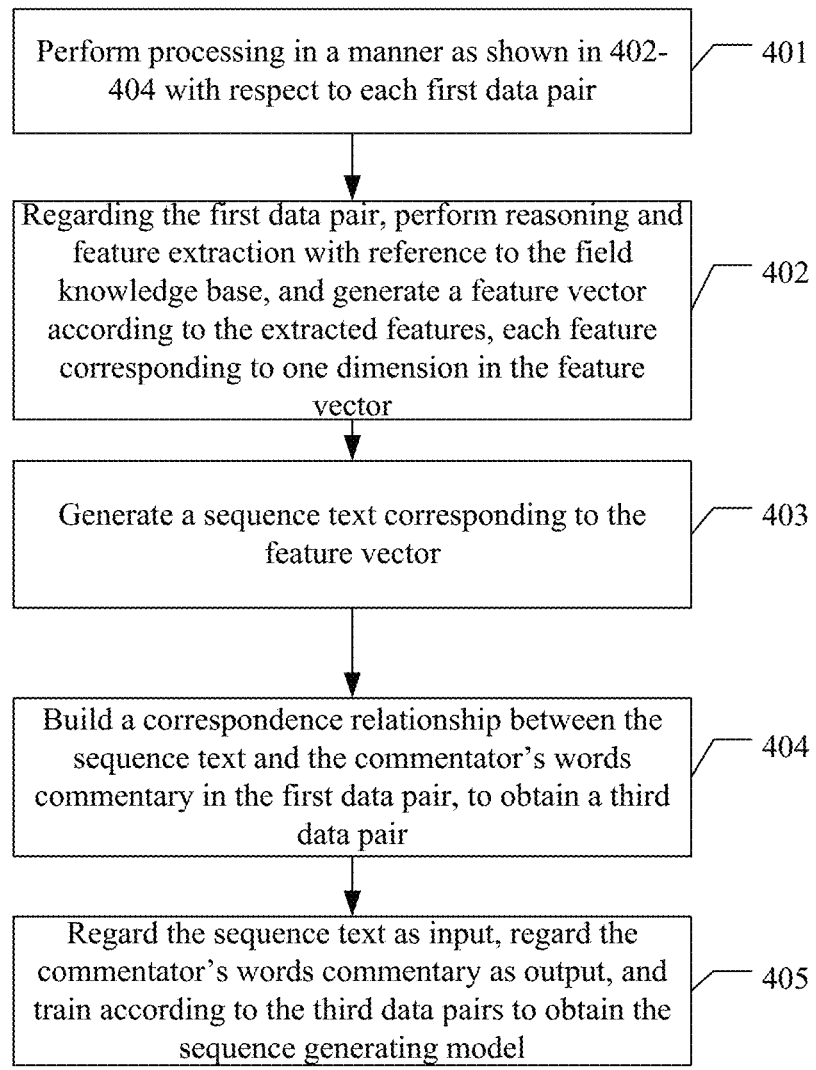
FIG. 4 is a flow chart of an embodiment of a method of obtaining a sequence generating model according to the present disclosure.

Correspondingly, FIG. 4 is a flow chart of an embodiment of a method of obtaining a sequence generating model according to the present disclosure. As shown in FIG. 4, the embodiment comprises the following specific implementation mode.

In 401, processing is performed in a manner as shown in 402-404 with respect to each first data pair.

402 relates to, regarding the first data pair, performing reasoning and feature extraction with reference to the field knowledge base, and generating a feature vector according to the extracted features, each feature corresponding to one dimension in the feature vector.

Reference may be made to related depictions in the above embodiments for specific implementations, which will not be detailed any more.

In 403, a sequence text corresponding to the feature vector is generated.

For example, it is feasible to perform literal translation for each dimension in the feature vector in respect of a feature name and a feature value, and join literal translation results of features of dimensions in a predetermined order, thereby obtaining the desired sequence text. 404 relates to building a correspondence relationship between the sequence text and the commentator's words commentary in the first data pair, to obtain a third data pair.

Obviously, a third data pair can be obtained with respect to each first data pair.

405 relates to regarding the sequence text as input, regarding the commentator's words commentary as output, and training according to the third data pairs to obtain the sequence generating model.

The sequence generating model may be a Recurrent Neural Model (RNN) model.

The sequence generating model may be obtained by training by regarding the obtained third data pairs as the training data. How to train to obtain the sequence generating model is of the prior art.

After the commentating mode model and the sequence generating model are obtained respectively, the two models may be used to perform online real-time commentation.

2) Online Real-Time Commentation Process

During live broadcast of a certain competition, a corresponding words commentary may be respectively determined according to the commentating model with respect to the structured data obtained each time.

Specifically, it is feasible to, with respect to the structured data obtained each time, determine a first words commentary according to the commentating mode model, determine a second words commentary according to the sequence generating model, and thereby select a better one from the first words commentary and second words commentary as a final words commentary.

Figure 5:
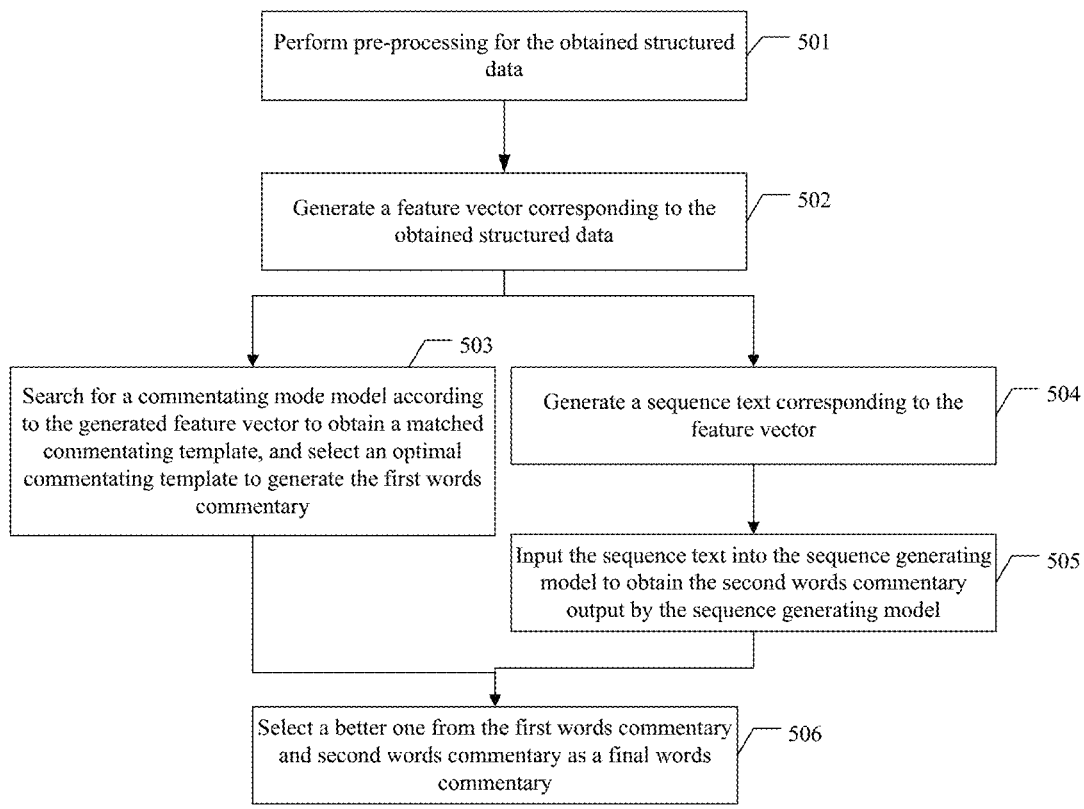
FIG. 5 is a flow chart of an embodiment of a method of generating real-time words commentary according to the present disclosure.

FIG. 5 is a flow chart of an embodiment of a method of generating real-time words commentary according to the present disclosure. As shown in FIG. 5, the embodiment comprises the following specific implementation mode.

In 501, pre-processing is performed for the obtained structured data.

The processing is optional, and for example, may include combining and dividing the structured data and reasoning partial fields. Specific implementations belong to the prior art.

502 relates to generating a feature vector corresponding to the obtained structured data, and then performing 503 and 504 respectively.

Reference may be made to related depictions in the above embodiments for how to generate the feature vector, which will not be detailed any more.

503 relates to searching for a commentating mode model according to the generated feature vector to obtain a matched commentating template, selecting an optimal commentating template to generate the first words commentary, and the performing 506.

How to search is of prior art. The number of the matched commentating templates found from the search may be one or larger than one.

If the number of the matched commentating templates is one, the first words commentary may be generated according to the commentating template and the structured data; if the number of the matched commentating templates is larger than one, it is feasible to select an optimal commentating template therefrom, and generate the first words commentary according to the selected commentating template and the structured data.

When the number of the matched commentating templates is larger than one, it is feasible to rank the commentating templates according to preset rules, select the commentating template ranking the first after the ranking, and regard the commentating template as the optimal commentating template. The specific rules may depend on actual needs.

The first words commentary may be obtained by an operation such as filling field values in the structured data into slots of the commentating template.

In 504, a sequence text corresponding to the feature vector is generated.

Reference may be made to related depictions in the above embodiments for how to generate the sequence text, which will not be detailed any more.

In 505, the sequence text is input into the sequence generating model to obtain the second words commentary output by the sequence generating model.

In 506, a better one is selected from the first words commentary and second words commentary as a final words commentary.

For example, the first words commentary and second words commentary may be selected based on information coverage for the structured data.

As can be seen from the above introduction, the solution of the present disclosure may be employed to generate the commentating model according to commentator's words commentaries and structured data of historical competitions so that subsequently during live broadcast of a competition, a corresponding words commentary is automatically generated according to the commentating model with respect to the structured data obtained each time. Furthermore, so long as the structure data is obtained, the words commentary may be generated almost without delay, thereby reducing time delay as compared with the prior art. Furthermore, automatic generation of the words commentary can avoid the errors stated in the prior art and thereby improve the accuracy of the commentary. In addition, automatic commentation may be performed many times so long as the commentating model is built one time, without professional commentators and with very low costs of implementation. Furthermore, the solution of the present disclosure is applicable for all competitions that generate structured data, and exhibits wide applicability.

It is further feasible to, on the basis of the above automatic commentation, control commentation emotion intensity, introduce modal particles and emojis related to emotion intensity to provide more personalized commentaries.

In addition, take commentation of a football match as an example. When products are displayed, it is also feasible to, in addition to commentation of the whole court of the match, provide commentaries from a viewpoint of a player, i.e., provide commentaries only on a certain player's performance in the match, thereby bringing about conveniences to spectators who love the play but do not have too much time to view the match of the whole court.

Figure 6:
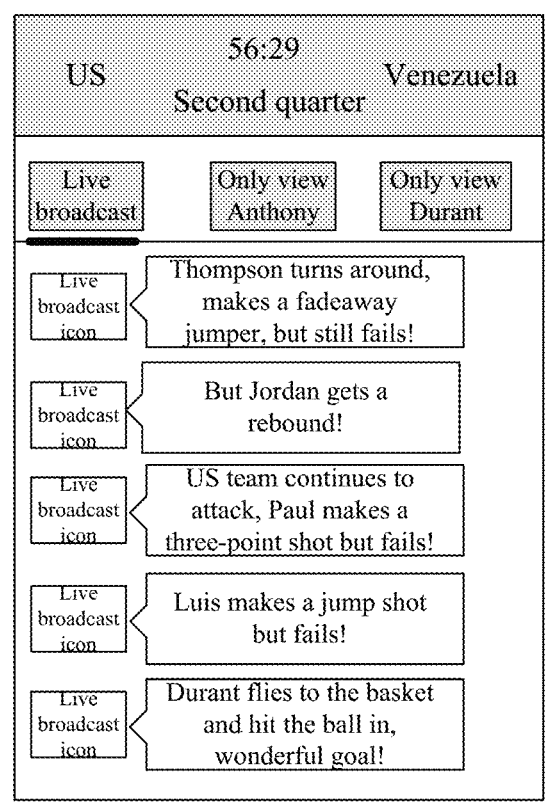
FIG. 6 is a schematic diagram of a basketball match commentating interface according to the present disclosure.

FIG. 6 is a schematic diagram of a basketball match commentating interface according to the present disclosure. As shown in FIG. 6, what is broadcast live is a US VS Venezuela match. The user may select "only view Anthony" or "only view Durant".

The above introduces the method embodiments. The solution of the present disclosure will be further described through an apparatus embodiment.

Figure 7:
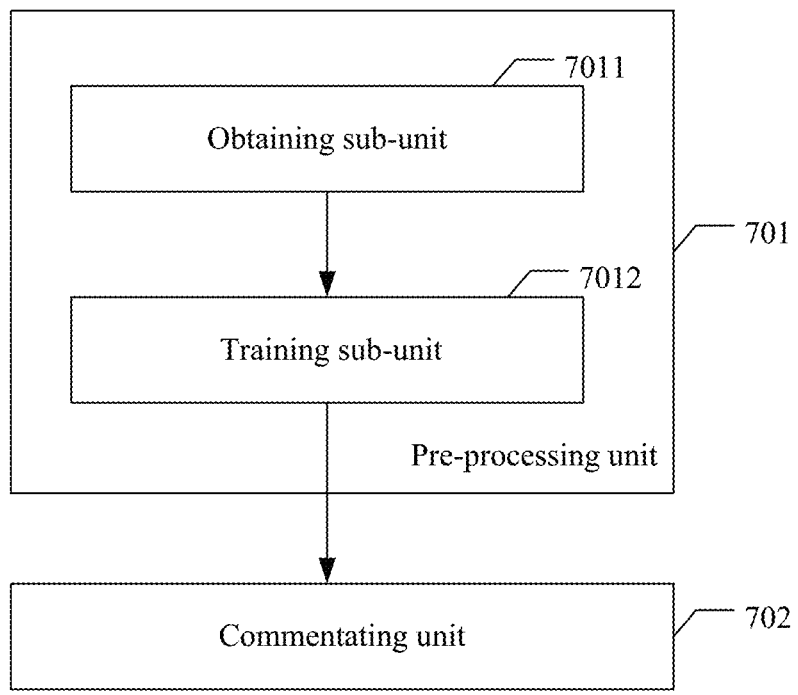
FIG. 7 is a block diagram of an embodiment of an apparatus of generating a competition commentary according to the present disclosure.

FIG. 7 is a block diagram of an embodiment of an apparatus of generating a competition commentary according to the present disclosure. As shown in FIG. 7, the apparatus comprises: a pre-processing unit 701 and a commentating unit 702.

The pre-processing unit 701 is configured to obtain commentator's words commentaries and structured data of historical competitions, and generate a commentating model according to obtained information.

The commentating unit 702 is configured to, during live broadcast of a competition, determine a corresponding words commentary according to the commentating model with respect to the structured data obtained each time.

Wherein the pre-processing unit 701 may comprise: an obtaining sub-unit 7011 and a training sub-unit 7012.

The obtaining sub-unit 7011 is configured to obtain commentator's words commentaries and structured data of historical competitions.

The training sub-unit 7012 is configured to align commentator's words commentaries with structured data to obtain a series of first data pairs formed by the commentator's words commentaries and corresponding structured data, and generate a commentating model according to the first data pairs.

The obtaining sub-unit 7011 is configured to obtain commentator's words commentaries and structured data of a plurality of historical competitions, take commentation of NBA as an example, to obtain commentator's words commentaries and structured data of a plurality of historical NBA matches.

In addition, it is feasible to pre-build a field knowledge base, namely, build an entity attribute knowledge base based on the competition type. Take commentation of NBA as an example. It is necessary to build a field knowledge base formed by players, teams, basketball technical terms.

The training sub-unit 7012, with respect to the obtained commentator's words commentaries and structured data of historical competitions, align commentator's words commentaries with structured data according to field values in the structured data and field values extracted from the commentator's words commentaries, thereby obtaining a series of first data pairs formed by the commentator's words commentaries and corresponding structured data.

Before aligning the commentator's words commentaries with the structured data, it is further feasible to perform data filtration, for example, remove data irrelevant to the commentation from the commentator's words commentaries, including comments, extended reports, message insertion and the like.

After obtaining the first data pairs, the training sub-unit 7012 may generate the commentating model based on the first data pairs. Specifically, there might be included two commentating models, namely, a first commentating model and a second commentating model.

The first commentating model may be a commentating mode model, and the second commentating model may be a sequence generating model.

To obtain the commentating mode model, the training sub-unit 7012 may perform the following processing with respect to each of the first data pairs:

perform slot extraction and generalization for commentator's words commentary in the first data pair according to a field knowledge base, remove redundant modifying components from a generalization result, and generate a commentating template;

with respect to the first data pair, perform reasoning and feature extraction with reference to the field knowledge base, and generate a feature vector according to the extracted features, each feature corresponding to one dimension in the feature vector;

build a correspondence relationship between the feature vector and the commentating template to obtain a second data pair;

regard the obtained second data pairs as the commentating mode model.

The extracted features may comprise: current event features, contextual features and dynamic features.

To obtain the sequence generating model, the training sub-unit 7012 may perform the following processing with respect to each of the first data pairs:

with respect to the first data pair, perform reasoning and feature extraction with reference to the field knowledge base, and generate a feature vector according to the extracted features, each feature corresponding to one dimension in the feature vector;

generate a sequence text corresponding to the feature vector;

build a correspondence relationship between the sequence text and the commentator's words commentary in the first data pair, to obtain a third data pair;

regard the sequence text as input, regard the commentator's words commentary as output, and train according to the third data pairs to obtain the sequence generating model.

Specifically, the training sub-unit 7012 performs literal translation for each dimension in the feature vector in respect of a feature name and a feature value, and joins literal translation results of features of dimensions in a predetermined order, thereby obtaining the desired sequence text.

After the commentating mode model and the sequence generating model are obtained respectively, the commentating unit 702 may use the two models to perform online real-time commentation for the competition, namely, during live broadcast of the competition, determine a corresponding words commentary according to the commentating model with respect to the structured data obtained each time.

Specifically, the commentating unit 702 may generate a feature vector corresponding to the obtained structured data, search for the commentating mode model according to the feature vector to obtain a matched commentating template, select an optimal commentating template to generate a first words commentary.

Furthermore, the commentating unit 702 may generate a feature vector corresponding to the obtained structured data, generate a sequence text corresponding to the feature vector, input the sequence text in the sequence generating model, and obtain the second words commentary output by a sequence generating model.

That is to say, with respect to the structured data obtained each time, the commentating unit 702 may determine the first words commentary according to the first commentating model, determine the second words commentary according to the second commentating model, and then select a better one from the first words commentary and second words commentary as a final words commentary.

Figure 8:
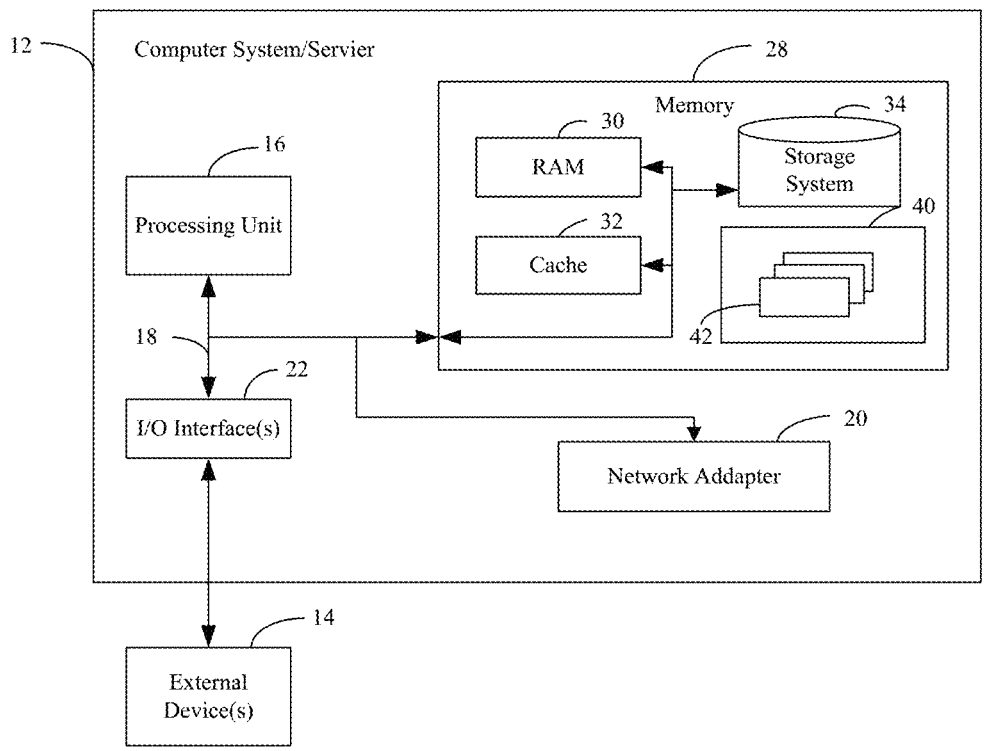
FIG. 8 illustrates a block diagram of an example computer system/server 12 adapted to implement an implementation mode of the present disclosure.

Reference may be made to corresponding depictions in the aforesaid method embodiment for a specific workflow of the apparatus embodiment shown in FIG. 7. The workflow is not detailed any more FIG. 8 illustrates a block diagram of an example computer system/server 12 adapted to implement an implementation mode of the present disclosure. The computer system/server 12 shown in FIG. 8 is only an example and should not bring about any limitation to the function and scope of use of the embodiments of the present disclosure.

As shown in FIG. 8, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 8 and typically called a "hard drive"). Although not shown in FIG. 8, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 8, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiment shown in FIG. 1, namely, obtain commentator's words commentaries and structured data of historical competitions; generate a commentating model according to obtained information; during live broadcast of a competition, determine a corresponding words commentary according to the commentating model with respect to the structured data obtained each time.

Reference may be made to related depictions in the above embodiments for specific implementations, which will not be detailed any more.

The present disclosure meanwhile provides a computer-readable storage medium on which a computer program is stored, the program, when executed by the processor, implementing the method stated in the embodiment shown in FIG. 1.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electro-magnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method of generating a competition commentary based on artificial intelligence, wherein the method comprises:
    obtaining commentator's words commentaries and structured data of historical competitions;
    generating a commentating model according to obtained information;
    during live broadcast of a competition, determining a corresponding words commentary according to the commentating model with respect to the structured data obtained each time,
    wherein the generating a commentating model according to obtained information comprises:
        aligning commentator's words commentaries with structured data to obtain a series of first data pairs formed by the commentator's words commentaries and corresponding structured data;
        generating the commentating model according to each first data pair,
    wherein the commentating model comprises: a first commentating model and a second commentating model;
    the determining a corresponding words commentary according to the first commentating model and the second commentating model with respect to the structured data obtained each time comprises:
        with respect to the structured data obtained each time, determining a first words commentary according to the first commentating model, and determining a second words commentary according to the second commentating model;
        selecting a better one from the first words commentary and second words commentary as a final words commentary,
    wherein the first commentating model is a commentating mode model, and generating the commentating mode model according to each first data pair comprises:
        performing the following processing with respect to each of the first data pairs:
        performing slot extraction and generalization for commentator's words commentary in the first data pair according to a pre-built field knowledge base, removing redundant modifying components from a generalization result, and generating a commentating template;
        with respect to the first data pair, performing reasoning and feature extraction with reference to the field knowledge base, and generating a feature vector according to extracted features, each feature corresponding to one dimension in the feature vector:
        building a correspondence relationship between the feature vector and the commentating template to obtain a second data pair;
        regarding each obtained second data pair as the commentating mode model, and
    wherein the extracted features comprise three classes: current event features, contextual features and dynamic features.

2. The method according to claim 1, wherein
the step of, with respect to the structured data obtained each time, determining a first words commentary according to the first commentating model comprises:
generating a feature vector corresponding to the obtained structured data;
searching for the commentating mode model according to the feature vector to obtain a matched commentating template, and selecting an optimal commentating template to generate the first words commentary.

3. The method according to claim 1, wherein
the second commentating template model is a sequence generating model, and generating the sequence generating model according to each first data pair comprises:
performing the following processing with respect to each of first data pairs:

with respect to the first data pair, performing reasoning and feature extraction with reference to the pre-built field knowledge base, and generating a feature vector according to extracted features, each feature corresponding to one dimension in the feature vector;

generating a sequence text corresponding to the feature vector;

building a correspondence relationship between the sequence text and the commentator's words commentary in the first data pair, to obtain a third data pair;

regarding the sequence text as input, regarding the commentator's words commentary as output, and training according to each third data pair to obtain the sequence generating model.

4. The method according to claim 3, wherein the generating a sequence text corresponding to the feature vector comprises:

performing literal translation for features of each dimension in the feature vector in respect of a feature name and a feature value;

joining literal translation results of features of dimensions in a predetermined order to obtain the sequence text.

5. The method according to claim 3, wherein the step of, with respect to the structured data obtained each time, determining a second words commentary according to the second commentating model comprises:

generating a feature vector corresponding to obtained structured data;

generating a sequence text corresponding to the feature vector;

inputting the sequence text in the sequence generating model, and obtaining the second words commentary output by the sequence generating model.

6. A computer device, comprising a memory, a processor and a computer program which is stored on the memory and runs on the processor, wherein the processor, upon executing the program, implements the following operation:

obtaining commentator's words commentaries and structured data of historical competitions;

generating a commentating model according to obtained information;

during live broadcast of a competition, determining a corresponding words commentary according to the commentating model with respect to the structured data obtained each time, wherein the generating a commentating model according to obtained information comprises:

aligning commentator's words commentaries with structured data to obtain a series of first data pairs formed by the commentator's words commentaries and corresponding structured data;

generating the commentating model according to each first data pair, wherein the commentating model comprises: a first commentating model and a second commentating model;

the determining a corresponding words commentary according to the first commentating model and the second commentating model with respect to the structured data obtained each time comprises:

with respect to the structured data obtained each time, determining a first words commentary according to the first commentating model, and determining a second words commentary according to the second commentating model;

selecting a better one from the first words commentary and second words commentary as a final words commentary, wherein the first commentating model is a commentating mode model, and generating the commentating mode model according to each first data pair comprises:

performing the following processing with respect to each of the first data pairs:

performing slot extraction and generalization for commentator's words commentary in the first data pair according to a pre-built field knowledge base, removing redundant modifying components from a generalization result, and generating a commentating template;

with respect to the first data pair, performing reasoning and feature extraction with reference to the field knowledge base, and generating a feature vector according to extracted features, each feature corresponding to one dimension in the feature vector;

building a correspondence relationship between the feature vector and the commentating template to obtain a second data pair;

regarding each obtained second data pair as the commentating mode model, wherein the extracted features comprise three classes: current event features, contextual features and dynamic features.

7. The computer device according to claim 6, wherein the operation of, with respect to the structured data obtained each time, determining a first words commentary according to the first commentating model comprises:

generating a feature vector corresponding to the obtained structured data;

searching for the commentating mode model according to the feature vector to obtain a matched commentating template, and selecting an optimal commentating template to generate the first words commentary.

8. The computer device according to claim 6, wherein the second commentating model is a sequence generating model, and generating the sequence generating model according to each first data pair comprises:

performing the following processing with respect to each of first data pairs:

with respect to the first data pair, performing reasoning and feature extraction with reference to the pre-built field knowledge base, and generating a feature vector according to extracted features, each feature corresponding to one dimension in the feature vector;

generating a sequence text corresponding to the feature vector;

building a correspondence relationship between the sequence text and the commentator's words commentary in the first data pair, to obtain a third data pair;

regarding the sequence text as input, regarding the commentator's words commentary as output, and training according to each third data pair to obtain the sequence generating model.

9. The computer device according to claim 8, wherein the generating a sequence text corresponding to the feature vector comprises:

performing literal translation for features of each dimension in the feature vector in respect of a feature name and a feature value;

joining literal translation results of features of dimensions in a predetermined order to obtain the sequence text.

10. The computer device according to claim 8, wherein
the operation of, with respect to the structured data obtained each time, determining a second words commentary according to the second commentating model comprises:
generating a feature vector corresponding to obtained structured data;
generating a sequence text corresponding to the feature vector;
inputting the sequence text in the sequence generating model, and obtaining the second words commentary output by the sequence generating model.

11. A non-transitory computer-readable storage medium on which a computer program is stored, wherein the program, when executed by a processor, implements the following operation:
obtaining commentator's words commentaries and structured data of historical competitions;
generating a commentating model according to obtained information;
during live broadcast of a competition, determining a corresponding words commentary according to the commentating model with respect to the structured data obtained each time,
wherein the generating a commentating model according to obtained information comprises:
aligning commentator's words commentaries with structured data to obtain a series of first data pairs formed by the commentator's words commentaries and corresponding structured data;
generating the commentating model according to each first data pair,
wherein the commentating model comprises: a first commentating model and a second commentating model;
the determining a corresponding words commentary according to the first commentating model and the second commentating model with respect to the structured data obtained each time comprises:
with respect to the structured data obtained each time, determining a first words commentary according to the first commentating model, and determining a second words commentary according to the second commentating model;
selecting a better one from the first words commentary and second words commentary as a final words commentary,
wherein the first commentating model is a commentating mode model, and generating the commentating mode model according to each first data pair comprises:
performing the following processing with respect to each of the first data pairs:
performing slot extraction and generalization for commentator's words commentary in the first data pair according to a pre-built field knowledge base, removing redundant modifying components from a generalization result, and generating a commentating template;
with respect to the first data pair, performing reasoning and feature extraction with reference to the field knowledge base, and generating a feature vector according to extracted features, each feature corresponding to one dimension in the feature vector;
building a correspondence relationship between the feature vector and the commentating template to obtain a second data pair;
regarding each obtained second data pair as the commentating mode model,
wherein the extracted features comprise three classes: current event features, contextual features and dynamic features.

12. The non-transitory computer-readable storage medium according to claim 11, wherein
the operation of, with respect to the structured data obtained each time, determining a first words commentary according to the first commentating model comprises:
generating a feature vector corresponding to the obtained structured data;
searching for the commentating mode model according to the feature vector to obtain a matched commentating template, and selecting an optimal commentating template to generate the first words commentary.

13. The non-transitory computer-readable storage medium according to claim 11, wherein
the second commentating model is a sequence generating model, and generating the sequence generating model according to each first data pair comprises:
performing the following processing with respect to each of first data pairs:
with respect to the first data pair, performing reasoning and feature extraction with reference to the pre-built field knowledge base, and generating a feature vector according to extracted features, each feature corresponding to one dimension in the feature vector;
generating a sequence text corresponding to the feature vector;
building a correspondence relationship between the sequence text and the commentator's words commentary in the first data pair, to obtain a third data pair;
regarding the sequence text as input, regarding the commentator's words commentary as output, and training according to each third data pair to obtain the sequence generating model.

14. The non-transitory computer-readable storage medium according to claim 13, wherein
the generating a sequence text corresponding to the feature vector comprises:
performing literal translation for features of each dimension in the feature vector in respect of a feature name and a feature value;
joining literal translation results of features of dimensions in a predetermined order to obtain the sequence text.

15. The non-transitory computer-readable storage medium according to claim 13, wherein
the operation of, with respect to the structured data obtained each time, determining a second words commentary according to the second commentating model comprises:
generating a feature vector corresponding to obtained structured data;
generating a sequence text corresponding to the feature vector;
inputting the sequence text in the sequence generating model, and obtaining the second words commentary output by the sequence generating model.

\* \* \* \* \*